(12) United States Patent
Papp et al.

(10) Patent No.: US 10,442,240 B2
(45) Date of Patent: Oct. 15, 2019

(54) COUPLER FOR CONNECTING LINES

(71) Applicants: John Papp, Waterbury, CT (US);
William John Papp, Harwinton, CT (US)

(72) Inventors: John Papp, Waterbury, CT (US);
William John Papp, Harwinton, CT (US)

( * ) Notice: Subject to any disclaimer, the term of this patent is extended or adjusted under 35 U.S.C. 154(b) by 0 days.

(21) Appl. No.: 14/989,869

(22) Filed: Jan. 7, 2016

(65) Prior Publication Data
US 2019/0009610 A1   Jan. 10, 2019

(51) Int. Cl.
*B44D 3/38* (2006.01)

(52) U.S. Cl.
CPC ..................... *B44D 3/38* (2013.01)

(58) Field of Classification Search
CPC ...... B44D 3/38; E04G 21/1825; G01B 3/1056
USPC .................. 33/414, 1 LE, 413, 755, 756
See application file for complete search history.

(56) References Cited

U.S. PATENT DOCUMENTS

| | | | | |
|---|---|---|---|---|
| 296,504 A * | 4/1884 | Atkins | ..................... | G01B 3/11 33/756 |
| 856,938 A * | 6/1907 | Beller | ..................... | G01B 3/1056 33/770 |
| 1,055,019 A * | 3/1913 | Cammarata | ......... | E04G 21/1825 33/409 |
| 1,303,756 A * | 5/1919 | Ballou | ................. | G01B 3/1056 33/758 |
| 2,685,739 A * | 8/1954 | Cole | ........................ | B25H 7/00 33/1 LE |
| 2,770,883 A * | 11/1956 | Hackney | ............. | G01B 3/1056 33/770 |
| 4,932,135 A * | 6/1990 | Wobser, II | .......... | E04G 21/1825 33/408 |
| 5,212,875 A * | 5/1993 | Corso | ...................... | B44D 3/38 242/388.8 |
| 5,822,874 A * | 10/1998 | Nemes | ..................... | B44D 3/38 33/414 |
| 6,415,519 B1 * | 7/2002 | Bennett | .................... | B44D 3/38 33/414 |
| 6,826,845 B2 * | 12/2004 | Pritchard | ................. | B44D 3/38 33/414 |
| 2009/0277027 A1 * | 11/2009 | Grisham | .................. | B44D 3/38 33/414 |
| 2019/0030945 A1 * | 1/2019 | Fox | .......................... | B44D 3/38 |

FOREIGN PATENT DOCUMENTS

FR        2679949 A3 *   2/1993   ............. B44D 3/38

* cited by examiner

*Primary Examiner* — Christopher W Fulton
(74) *Attorney, Agent, or Firm* — Grogan, Tuccillo & Vanderleeden, LLP

(57) ABSTRACT

A coupling device for connecting first and second chalk lines includes a generally planar body portion having a first end, a second end and opposed sides edges, an aperture formed in the body portion adjacent to the first end for attaching a free end of a first chalk line to the coupling device, and a plurality of spaced apart and linearly aligned hooks extending from the body portion adjacent to one of the side edges, the plurality of hooks defining a channel for receiving a second chalk line therethrough. Each of the hooks includes a clearance portion for insertion of the second chalk line into the channel defined by the plurality of hooks.

17 Claims, 6 Drawing Sheets

COUPLER FOR CONNECTING LINES

STATEMENT REGARDING FEDERALLY-SPONSORED RESEARCH OR DEVELOPMENT

Not Applicable.

FIELD OF THE INVENTION

The present invention is directed to a coupler that permits two users to simultaneously operate two chalk lines. The coupler enables each user to alternatively reel and recharge each of the chalk lines, greatly reducing the amount of time required to lay multiple lines across the same surface and increasing the safety of both users by allowing them to stay on opposite ends of the line.

BACKGROUND OF THE INVENTION

During building construction, it is necessary to mark chalk lines on a variety of surfaces. Chalk lines or other colored substances run along thin rope or string are "snapped" to leave a colored mark in a straight line of said surfaces. The state of the art in one embodiment requires a user to anchor a chalk line to an attachment point and pace the length of the desired line, "snap" to make the line, then return to re-anchor the chalk line to another attachment point.

In another embodiment, a user obtains the assistance of a second user to alternately fix and move one end of the chalk line to make multiple lines. In order to recharge or recolor the lines, they must be reeled into the base repeatedly or they are unable to create multiple chalk lines. This repeated reeling takes a substantial amount of time whether there are one user or two. Additionally, the second user must also move towards the reel in order to retain a grip on the end of the chalk line, potentially putting him or her at a risk of a fall.

A plurality of chalk lines is common in siding or roofing projects, where many parallel lines must be placed across a surface which is elevated and angled or vertical. In some cases, scaffolding, ladders, or other safety devices are used by one or both users, which increases the time spent by one user to climb up and down each time the chalk line is recharged. Additionally, the climbing user faces an increased risk of fall or injury as a result of the repeated climbs.

There exists in the art a method of tying two chalk lines together. However, this marks the user's hands as well as risks a too-loose knot which comes undone during use or a too-tight knot which requires a portion of one or both chalk lines to be cut to detach them. The time lost to sever and re-tie lines discourages users from using this method. Over time, the chalk lines' length is diminished as the knots are cut out after use.

There further exists in the art a product where a single contiguous line reels back and forth between two bases. This product is expensive, unwieldly and only in use frequently on large-scale commercial sites. It is not easily portable by a user on a tool belt.

There is a need in the marketplace to accommodate multiple chalk lines operated by two users for high-frequency marking with chalk lines, such as in roofing and siding a building, framing or other construction processes. There is no current commercial embodiments of a coupler that can removably join multiple chalk lines. The present invention meets an unmet need in the market by introducing a structured coupler which maintains straight chalk lines while permitting a user to reel and recharge each chalk line between making multiple marks.

SUMMARY OF THE INVENTION

The present invention resides in one aspect in a coupler. The coupler has an attachment point with a one or more hooks to receive a chalk line. The chalk line is removably attached to any of the attachment points.

DETAILED DESCRIPTION

Figure 1A:
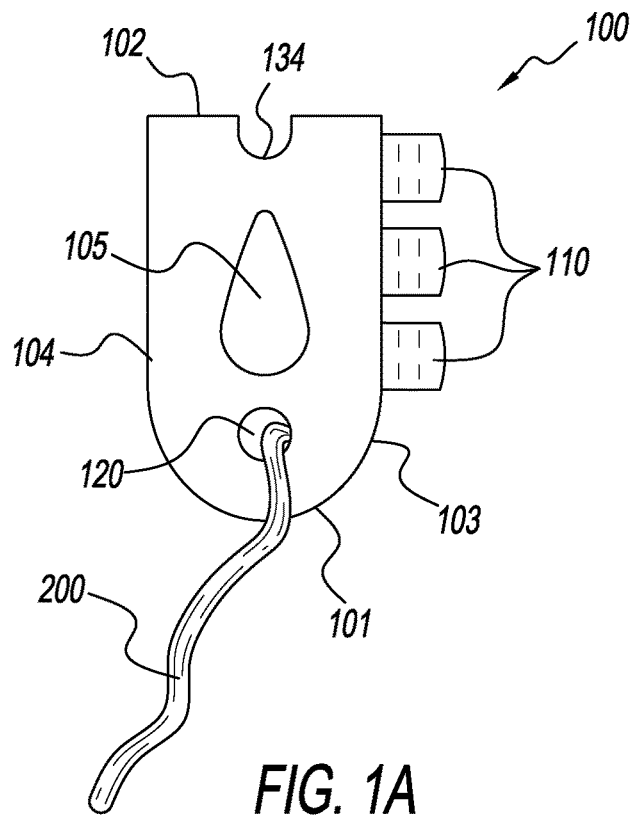
FIG. 1a is a side view of a coupler.

As shown in FIG. 1a, a coupler 100 may be composed of a pressed, stamped, or machined metal, molded plastic or other polymer, or other suitable material. In one embodiment, the coupler 100 has a line end 101 opposite from a clip end 102. The coupler 100 further has a free side 104 opposite or mostly opposite from a hook side 103.

Figure 1B:
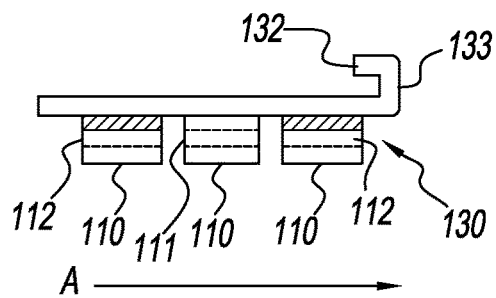
FIG. 1b is an end side view of the coupler.

As shown in FIGS. 1a and 1b, in one embodiment the hook side 103 of the coupler 100 has a plurality of hooks 110 extending therefrom. The hooks 110 may be molded, pressed, or stamped of the same material as the coupler 100, or they may be fixably attached thereto. Each of the hooks 110 has a hook arm 114 extending away from the coupler 100 in a curve. The hook arms 114 form a channel 116 that is large enough to accommodate the intended line such as, for example, a chalk line.

Figure 1C:
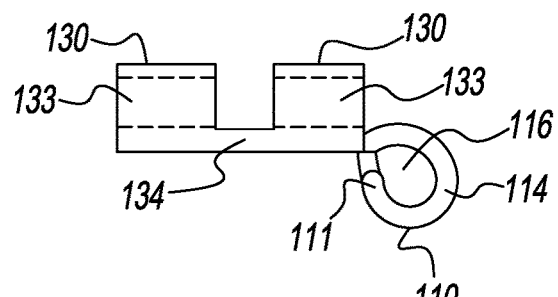
FIG. 1c is a top view of one embodiment of the coupler.
Figure 5A:
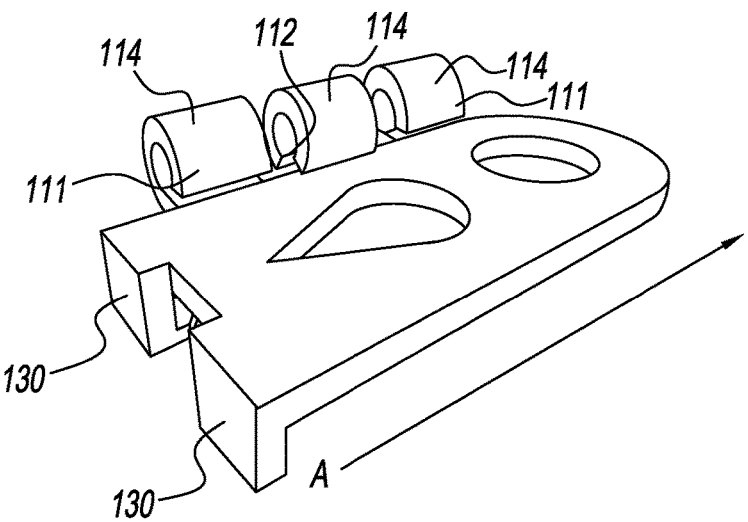
FIG. 5a is an isometric end view of one embodiment of the coupler.
Figure 5B:
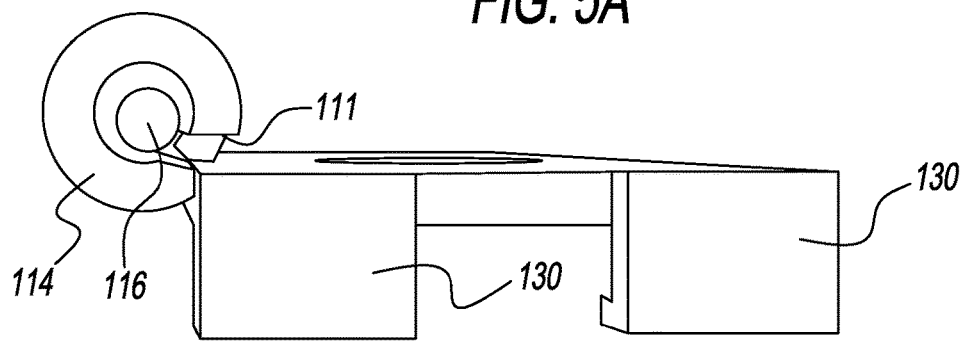
FIG. 5b is an isometric end view of the hook end of one embodiment of the coupler, showing a channel.
Figure 5C:
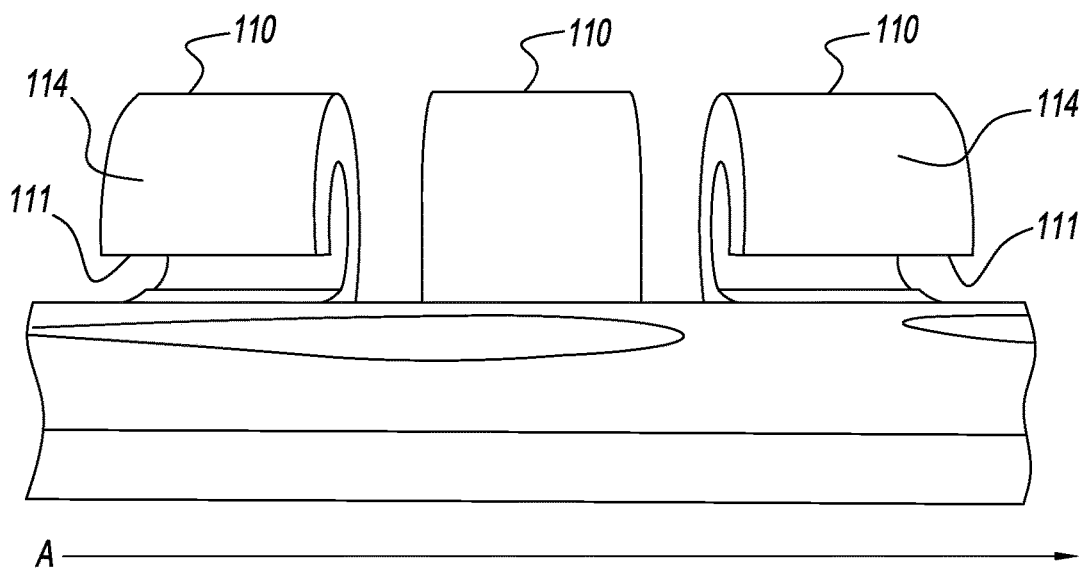
FIG. 5c is a partial isometric side view of the free side of one embodiment of the coupler.

As shown in FIGS. 1c and 5b, each hook arm 114 follows no less than 180 degrees and no more than 355 degrees of the circumference of a circle around the channel 116. Each hook arm 114 is further concentric to the other hook arms and describes an equal circumference of the channel 116. In addition to concentricity, each hook 110 is approximately the same diameter as the others, although the width of the hooks may vary in some embodiments.

As shown in FIG. 1b, each hook arm 114 terminates in a hook end which is either an inward facing hook end 111 or an outward facing hook end 112. Each of the plurality of hooks 110 alternate whether they terminate in an outward facing hook end 112 or an inward facing hook end 111. The line 300 passes through the channel 116 such that the anchor 310 is towards the line end 101 and extends towards the dip end 102 in the direction indicated by Line A.

As shown in FIGS. 1b and 1c, the clip end 102 of the coupler 100 has one or more clips 130 extending therefrom. The clips 130 may be molded, pressed, or stamped of the same material as the coupler 100, or they may be fixably attached thereto. Each of the clips 130 has a clip arm 133 extending away from the plane of the coupler 100 at approximately a right angle. Each of the clips 130 further has a clip end 132 which functions as a catch, grip, or anchor for the clip 130, such as for example causing the clip 130 to removably attach to a board or scaffold. In one embodiment, the clip ends 132 are blunt. In another embodiment, the clip ends 132 are pointed or pronged in a way to give them greater adherence to an intended anchor such as, for example, a wood board or cement foundation.

As shown in FIG. 1a, in one embodiment the coupler 100 has a hollow 105. The hollow 105 is a hole of any shape or any size intended to reduce the mass of the coupler 100 as well as serve as a thumb or finger hold for a user. In one embodiment, the hollow 105 also functions as an anchor point, such as, for example, hooking on a nail, and is shaped accordingly.

As shown in FIG. 1a, in one embodiment the coupler 100 has a clip end hollow 134. In one embodiment having two or more clips 130, the clip end hollow 134 is a carved out space between the plurality of clips 130. The clip end hollow 134 reduces the mass of coupler 100 and facilitates the functionality of the clips 130 by enabling the clip ends 132 to be anchored in a tight spot or enabling the coupler 100 having a plurality of clips 130 to be anchored by using only one of the clips 130.

Figure 2:
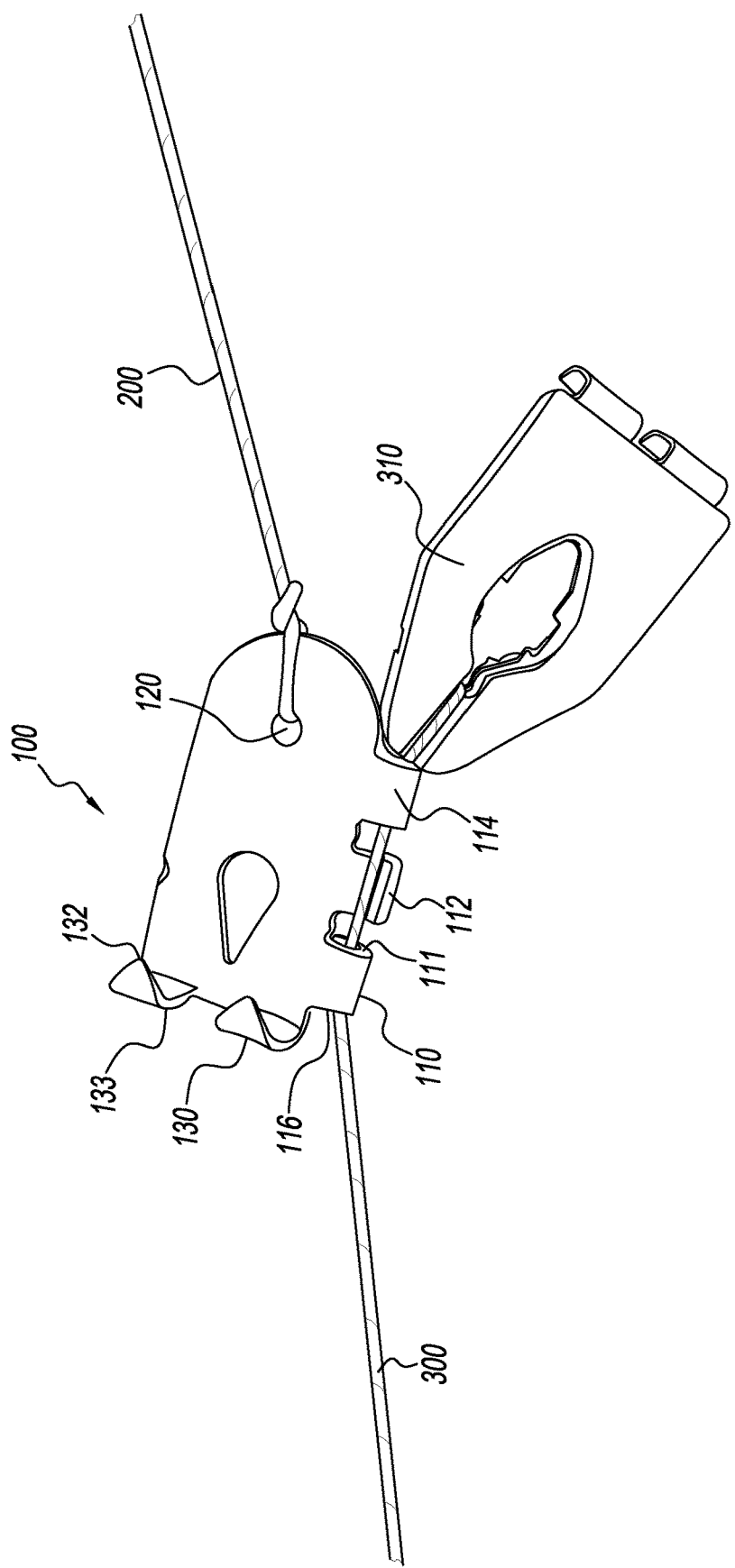
FIG. 2 is an isometric top view of one embodiment of the coupler attached to a line.

As shown in FIG. 2, the coupler 100 may be removably attached to a line 300. A user may thread or unthread the intended line 300 such as, for example, a chalk line through each of the plurality of alternating hooks 110 easily. A line 200 is attached to a line attachment 120. The line attachment 120 is a hole or protrusion in the coupler 100 towards the line end 101. In one embodiment, the line 200 is a chalk line that is wound into a chalk line base and can be uncoiled and recoiled by a user. A user attaches the line 200 either fixably or removably by tying a knot or otherwise binding the line 200 to the coupler 100.

As shown in FIG. 2, the intended line 300 further has an anchor 310. This anchor 310 may be a commercially-available chalk line end as shown, or it may be any object fixably attached to the intended line 300 of suitably size to prevent the anchor 310 from entering the channel 116. A user may create an anchor 310 by forming a large knot, or attaching an object such as, for example, a screw or nail, to the intended line 300 in the event that the commercially-available chalk line end is not accessible. The intended line 300, in one embodiment, is a chalk line that is wound into a chalk line base and can be uncoiled and recoiled by a user.

Figure 3:
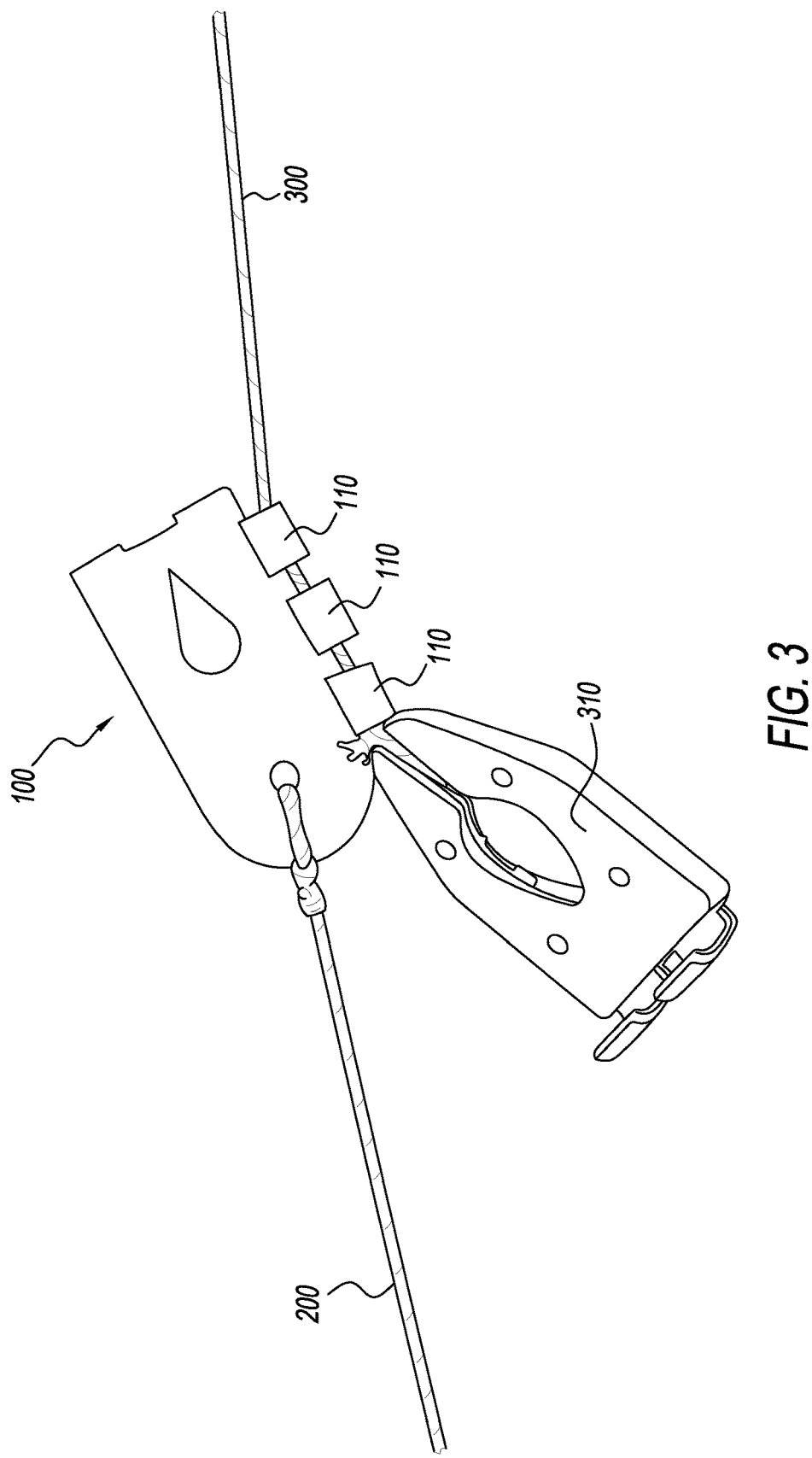
FIG. 3 is an isometric bottom view of one embodiment of the coupler attached to a line.

FIG. 3 shows an alternate view of the above-described coupler 100 removably joined with a commercially-available anchor 310.

Figure 4:
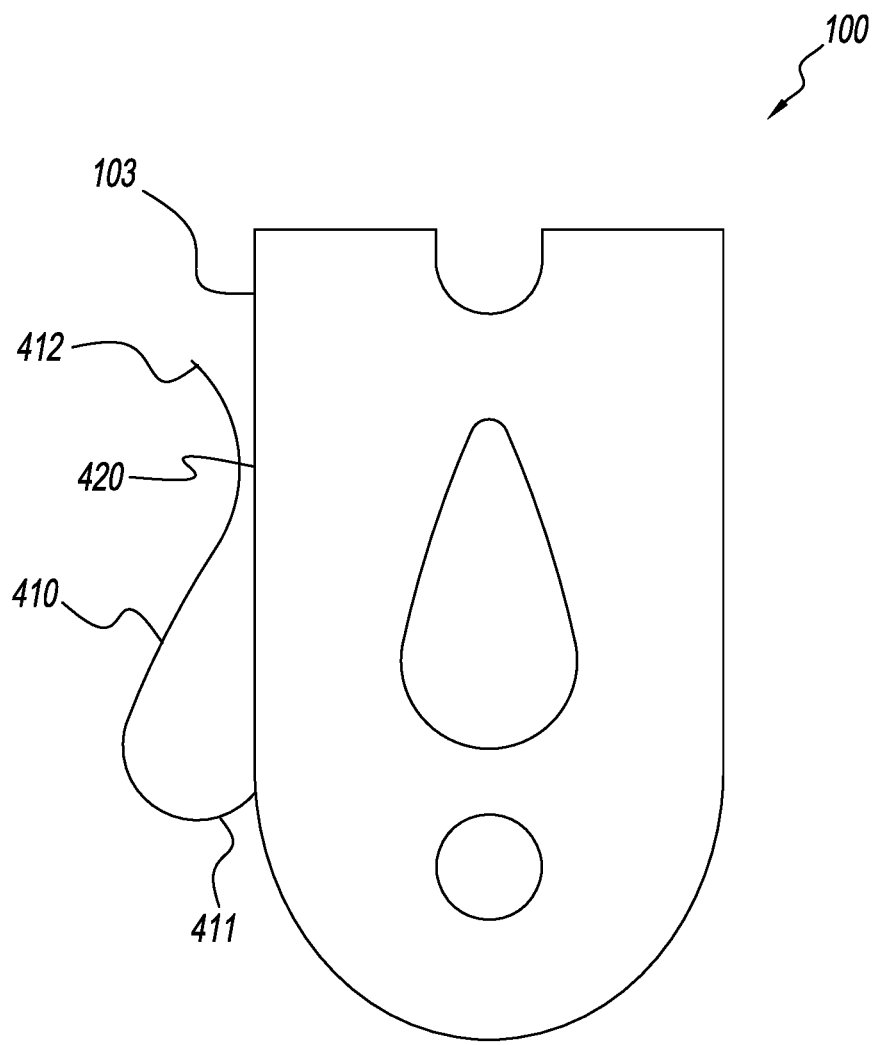
FIG. 4 is a top view of another embodiment of the coupler.

As shown in FIG. 4, in one embodiment the hook side 103 of the coupler 100 has a spring hook 410 extending therefrom. The spring hook 410 may be molded, pressed, or stamped of the same material as the coupler 100, or it may be fixably attached thereto. The spring hook 410 has a base end 411 and a clip end 412, the base end 411 being attached fixedly or removably to the hook side 103 of the coupler 100. The clip end 412 contacts the hook side 103 at a point 420 with enough spring tension that a chalk line 300 may be held securely.

Figure 6A:
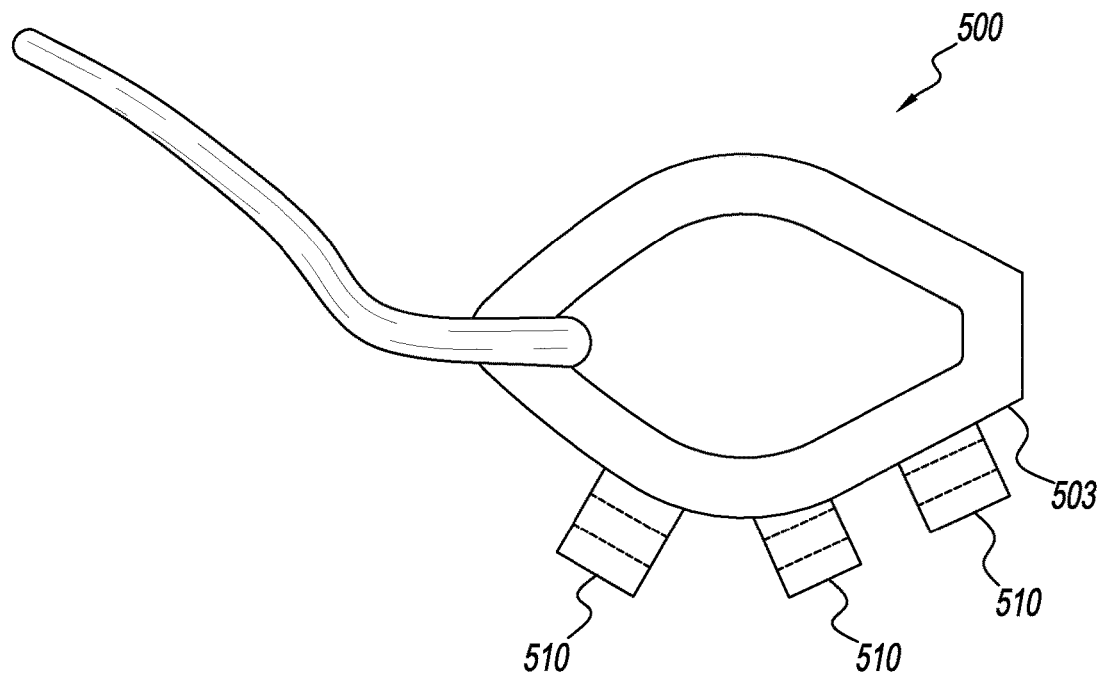
FIG. 6a is a top view of another embodiment of the coupler.
Figure 6B:
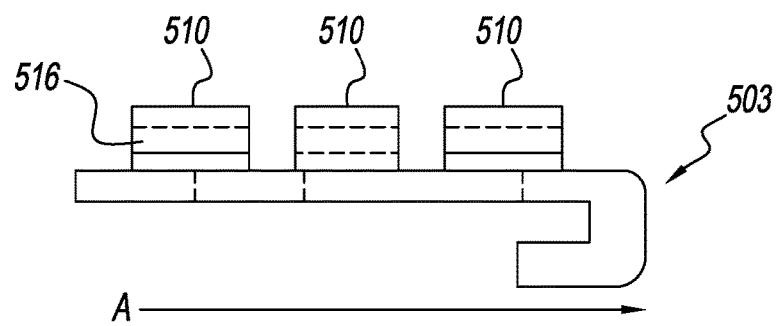
FIG. 6b is a side view of another embodiment of the coupler.

As shown in FIG. 6a, in one embodiment, a hook side 503 of a coupler 500 may be curved. The hooks 510 may be molded, pressed, or stamped of the same material as the coupler 100, or they may be fixably attached thereto. Each of the hooks 510 has a hook arm 514 extending away from the coupler 500 in a curve. The hook arms 514 form a channel 516 that is large enough to accommodate the intended line such as, for example, a chalk line. Each hook arm 514 follows no less than 180 degrees and no more than 355 degrees of the circumference of a circle around the channel 516. Each hook arm 514 describes an equal circumference of the channel 516. The channel 516 follows the curve of the hook side 503. Each hook arm 514 terminates in a hook end which is either and inward facing hook end 511 or an outward facing hook end 512. Each of the plurality of hooks 510 alternate whether they terminate in an outward facing hook end 512 or an inward facing hook end 511. In addition to concentricity, each hook 510 is approximately the same diameter as the others, although the width of the hooks may vary in some embodiments.

In another embodiment a screw provides the necessary tension to hold the chalk line 300. The screw is operated by the user to securely attach the line 300 for use, then later loosen and remove the line 300 from the coupler 100.

In another embodiment, the coupler is used to removably attach large ropes such as between a ship and a barge. The size and scale of the present invention are not limited by the above disclosure.

It is understood that in other embodiments of the present invention the coupler 100 may be any combination of the types described above. It is understood that one skilled in the art may identify another embodiment of the present invention, particularly the method of securely by removably attaching the line 300 by use of tools, or through any of a variety of angles or arrangements of the clips 110.

A number of embodiments of the invention have been described. Nevertheless, it will be understood that various modifications may be made without departing from the spirit and scope of the invention. Accordingly, other embodiments are within the scope of the following claims.

What is claimed is:

1. A coupling device for connecting lines, comprising:
   a body portion configured to receive a free end of a first line; and
   a coupling mechanism attached to the body portion and being configured to releasably engage a second line;
   wherein the coupling mechanism engages a portion of the second line adjacent to a distal end of the second line;
   wherein the coupling mechanism includes a plurality of hooks each having an opening for insertion of the second line;
   wherein an opening of at least one of the plurality of hooks faces in a direction different from an opening of another of the plurality of hooks;
   wherein the plurality of hooks are attached to the body portion along an edge of the body portion; and
   wherein the plurality of hooks are coaxial.

2. The coupling device of claim 1, wherein:
   the plurality of hooks is three hooks including a pair of outer hooks and an intermediate hook;
   wherein the opening of the intermediate hook of the three hooks is one of inward facing and outward facing; and
   wherein the openings of the outer hooks are the other of inward facing and outward facing.

3. The coupling device of claim 2, wherein:
   the opening of the intermediate hook is outward facing; and
   the openings of the outer hooks are inward facing.

4. The coupling device of claim 1, wherein:
the body portion includes a first end and a second end opposite the first end, and an aperture at the first end for receiving the free end of the first line; and
the coupling device further includes at least one clip extending generally perpendicular from the body portion at the second end.

5. The coupling device of claim 4, wherein:
the at least one clip has a pointed tip for anchoring the coupling device.

6. The coupling device of claim 1, wherein:
the plurality of hooks are generally cylindrical in shape and have a circumference that extends between about 180 degrees and 355 degrees.

7. The coupling device of claim 1, wherein:
the first line is a first chalk line; and
the second line is a second chalk line.

8. A coupling device for connecting first and second chalk lines, comprising:
a generally planar body portion having a first end, a second end and opposed sides edges;
an aperture formed in the body portion adjacent to the first end for attaching a free end of a first chalk line to the coupling device; and
a plurality of spaced apart and linearly aligned hooks extending from the body portion adjacent to one of the side edges, the plurality of hooks defining a channel for receiving a second chalk line therethrough;
wherein each of the hooks includes a clearance portion for insertion of the second chalk line into the channel defined by the plurality of hooks.

9. The coupling device of claim 8, wherein:
the clearance portion of at least one of the plurality of hooks is generally inward facing; and
the clearance portion of at least another of the plurality of hooks is generally outward facing.

10. The coupling device of claim 9, wherein:
the plurality of hooks is three hooks including a pair of outer hooks and an intermediate hook;
wherein the clearance portion of the intermediate hook is generally inward facing; and
wherein the clearance portions of the outer hooks are generally outward facing.

11. The coupling device of claim 9, wherein:
the plurality of hooks are generally cylindrical in shape and have a circumference that extends between about 180 degrees and 355 degrees.

12. The coupling device of claim 9, further comprising:
at least one clip extending generally perpendicular from the body portion at the second end.

13. The coupling device of claim 12, wherein:
the at least one clip has a pointed tip for anchoring the coupling device.

14. The coupling device of claim 8, wherein:
at least one of the side edges is curved.

15. A method for connecting first and second chalk lines, comprising the steps of:
securing a first chalk line to a coupling device having a generally planar body portion having a first end, a second end, and a plurality of spaced apart hooks extending from the body portion adjacent to a side edge of the body portion; and
inserting a second chalk line having an anchor secured to a distal end of the second chalk line through respective lateral clearance portions formed in the plurality of hooks so that the second chalk line is received within a receiving channel defined by the plurality of hooks;
wherein when the second chalk line is received in the receiving channel, the anchor cannot be pulled axially through the receiving channel.

16. The method according to claim 15, wherein:
the plurality of hooks are generally cylindrical in shape and have a circumference that extends between about 180 degrees and 355 degrees.

17. The method according to claim 15, further comprising the step of:
reeling in the first chalk line to recharge the first chalk line; and
reeling in the second chalk line to recharge the second chalk line;
wherein the reeling steps are accomplished without decoupling the first chalk line from the second chalk line.

* * * * *